United States Patent [19]
Parkes

[11] 3,941,232
[45] Mar. 2, 1976

[54] CURVED PATH DELIVERY CONVEYOR

[76] Inventor: Ralph C. Parkes, Hancock St. & Lehigh Ave., Philadelphia, Pa. 19133

[22] Filed: Dec. 17, 1973

[21] Appl. No.: 425,076

[52] U.S. Cl. ............................. 198/20 R; 198/129
[51] Int. Cl.[2] ......................................... B65G 47/00
[58] Field of Search........... 198/20 R, 129, 184, 230

[56] References Cited
UNITED STATES PATENTS
676,920   6/1901   Schreiber.......................... 198/20 X FOREIGN PATENTS OR APPLICATIONS
291,971   10/1969   U.S.S.R............................. 198/129
439,097   12/1967   Switzerland....................... 198/20 R Primary Examiner—Evon C. Blunk
Assistant Examiner—Douglas D. Watts
Attorney, Agent, or Firm—Weiser, Stapler & Spivak

[57] ABSTRACT

The invention includes a delivery conveyor to receive freshly baked products from baking pans of an automatic baking oven. The baking pans containing freshly baked products follow an arculate path at the discharge end of the oven for releasing freshly baked goods. The delivery conveyor positions at the discharge end of the oven and follows a curved path which is parallel to and closely spaced from the baking pans to prevent the newly baked goods from falling through a distance that is sufficient to cause breakage. The belt rotates about three rollers which are equipped with end sprockets and assumes a curved configuration by taking advantage of the natural sag in the upper belt path. Contoured guides which are affixed to the oven frame shape the slack side of the belt to the correct curved path.

14 Claims, 4 Drawing Figures

CURVED PATH DELIVERY CONVEYOR

BACKGROUND OF THE INVENTION

The invention relates generally to belt conveyors and, more particularly, is directed to a unique curved path delivery conveyor.

On Feb. 20, 1973, the applicant filed an application for U.S. Pat. Ser. No. 333,741 entitled "Baking Oven", now U.S. Pat. No. 3,804,583, in which was disclosed an automatic oven and proofer which incorporated a plurality of baking trays which were directed through the apparatus by means of a continuous conveying system. Following the proofing and baking procedures, the baking trays were carried exteriorly of the oven wherein the trays were individually rotated through 180° for baked product release purposes. It has been found that the baking oven disclosed in Ser. No. 333,741 is highly efficient in operation and functions well to automatically and rapidly bake quantities of individual baked products such as biscuits, cup cakes and the like. In order to assure optimum results and to deliver baked goods in as fresh a condition as possible to the user, it is necessary to package and handle the baked products while still hot and fresh and without allowing any appreciable time for cooling. The freshly baked product is quite fragile and highly susceptible to breakage if permitted to fall through too great a distance. The present invention is designed to receive the freshly baked product from the baking trays in a manner to prevent the baked goods from falling through a distance sufficient to cause breakage as the product is released from the baking trays.

SUMMARY OF THE INVENTION

The present invention relates generally to the field of conveyors and, more particularly, is directed to a curved path delivery conveyor suitable to receive freshly baked goods from an automatic baking oven in a manner to prevent breakage or other damage.

The present invention is positioned at the delivery end of an automatic baking oven and includes a belt of "Teflon" coated fiber glass material which extends transversely across the entire discharge end of the oven. The delivery conveyor of the present invention and the oven conveyor system are driven at the same speed by means of a belt and pulley system which interconnects the oven conveyor system with the curved path delivery conveyor system.

As the oven conveyor carries the rotatable baking trays to the delivery end of the oven, fingers which project transversely outwardly from the ends of the baking trays contact stationary, strategically positioned cam surfaces which function to rotate the trays through 180° for product discharge purposes as the oven conveyor carries the baking trays exteriorly of the baking enclosure. The top surfaces of the baking trays travel through an arcuately curved path when releasing the fully baked product as the trays are turned through 180° for product release. By taking advantage of the natural sag in the top of the delivery conveyor belt, the belt is guided in the same path of travel as followed by the top surface of each baking tray as it turns and rotates at the bottom of the discharge end of the oven for product release. Contoured guides which are affixed to the oven frame shape the slack side of the belt conveyor to the correct, desired curved path configuration.

The general purpose of the invention is to maintain the curved upper path of the delivery belt conveyor in parallel, spaced alignment with the path traveled by each baking tray when releasing the fully baked product to thereby prevent the fragile, newly baked cakes from falling through a distance sufficient to cause breakage at whatever point the baked goods are released.

The transverse edges of the fiber glass belt delivery conveyor are provided with a plurality of spaced grommets which cooperate with transversely positioned sprockets to drive the belt conveyor at uniform speed in conjunction with the oven conveyor drive system. The slack side of the belt is employed as the working surface to receive and transport the newly baked products. The bottom side of the belt is tensioned for drive purposes but is otherwise unused in the process. Preferably, a bottom positioned wash roller continuously contacts the lower side of the belt for belt surface cleaning in conjunction with a stationary doctor blade.

It is therefore an object of the present invention to provide an improved curved path delivery conveyor of the type set forth.

It is another object of the present invention to provide a novel curved path delivery conveyor wherein the slack side of the conveyor is the working surface and the tensioned side of the conveyor is employed only for driving purposes.

It is another object of the present invention to provide a novel curved path delivery conveyor which is employed in conjunction with an automatic baking oven wherein an upper, curved delivery conveyor surface is provided in spaced, arcuate relationship with the path followed by the tops of baking trays during product release procedures.

It is another object of the present invention to provide a novel curved path delivery conveyor for use in conjunction with the conveyor system of an automatic oven wherein the delivery conveyor functions at the same speed as the oven conveyor system and wherein the upper delivery conveyor belt path follows the path of travel of tops of baking trays as they are rotated at the discharge end of the oven.

It is another object of the present invention to provide a novel curved path delivery conveyor for use in conjunction with an automatic baking oven which is fabricated of Teflon impregnated fiber glass material and which is guided about three rollers, only two of which lie in the same plane.

It is another object of the present invention to provide a novel curved path delivery conveyor for use in conjunction with an automatic baking oven and which includes a fiber glass belt or other material belt which is trained about three rollers and wherein the slack side of the belt is employed as the working surface for baked goods receiving purposes.

It is another object to furnish a belt paralleling the inverted carriers at the same speed to align the multiple discharged product regardless of the difference in release time so they automatically transfer in spaced sequence for further processing i.e., icing, packaging, etc.

It is another object of the present invention to provide a novel curved path delivery conveyor incorporating an endless belt which is trained about three rollers to provide an upper slack side and a lower tensioned side and wherein the slack side is supported upon curved guides to shape the top surface in a desired arcuate path configuration.

It is another object of the present invention to provide a novel curved path delivery conveyor that is simple in design, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
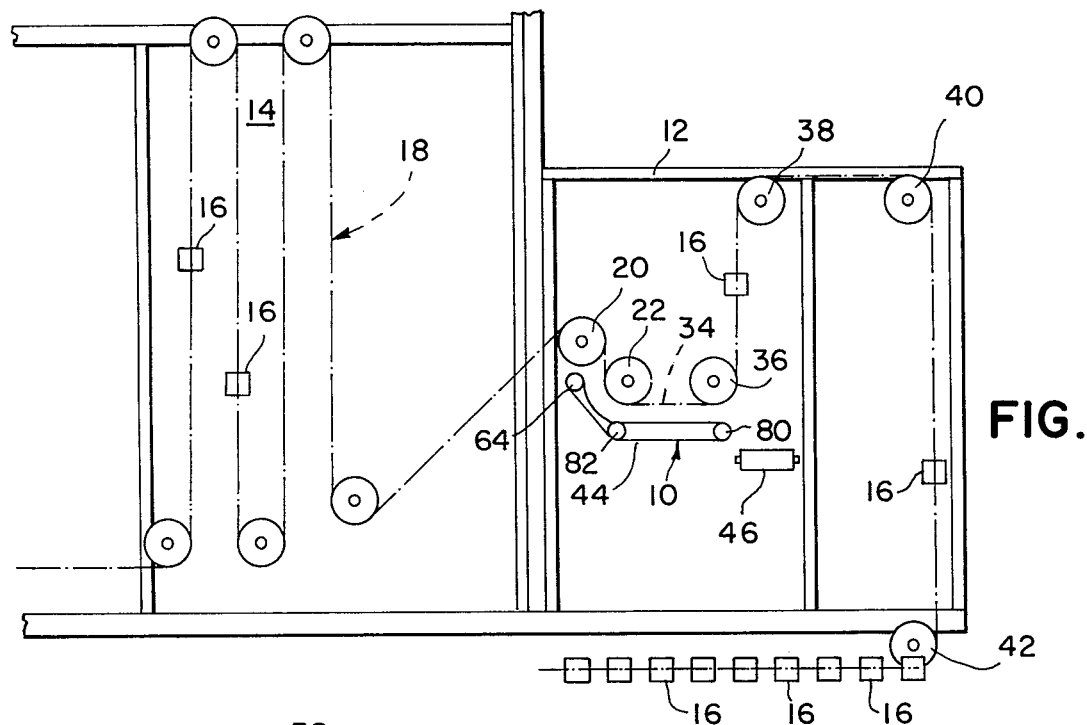
FIG. 1 is a schematic, side elevational view of the invention as applied to a conveyor type automatic baking oven.

Although specific terms are used in the following description for the sake of clarity, these terms are intended to refer only to the particular structure of my invention selected for illustration in the drawings and are not intended to define or limit the scope of the invention.

Referring now to the drawings, I show in FIG. 1 a curved path delivery conveyor 10 which is applied at the discharge end 12 of a conveyor type baking oven 14. The baking oven 14 may be of the type disclosed in my pending application Ser. No. 333,741, filed Feb. 20, 1973, wherein a plurality of baking trays 16 are carried through the oven 14 upon a chain link type conveyor system 18. Upon completion of the baking operations within the baking oven 14, the conveyor system 18 carries the baked product pans to the discharge end 12. The baking trays 16 are directed about an upper and lower pair of discharge rolls 20, 22 which, in conjunction with suitable guides 24, (FIG. 2) serve to rotate each baking tray 16 through 180° for baked product 26 release purposes. The geometry of the system is such that one end 28 of each baking tray 16 is provided with a plurality of corner disposed pins 30 which function automatically in conjunction with the upper discharge roll 20, the lower discharge roll 22 and the turn guide 24 to fully rotate each baking tray 16 through 180° as the conveyor system 18 carries each tray through the baking tray rotation system which is provided for automatic baked product release purposes.

Figure 2:
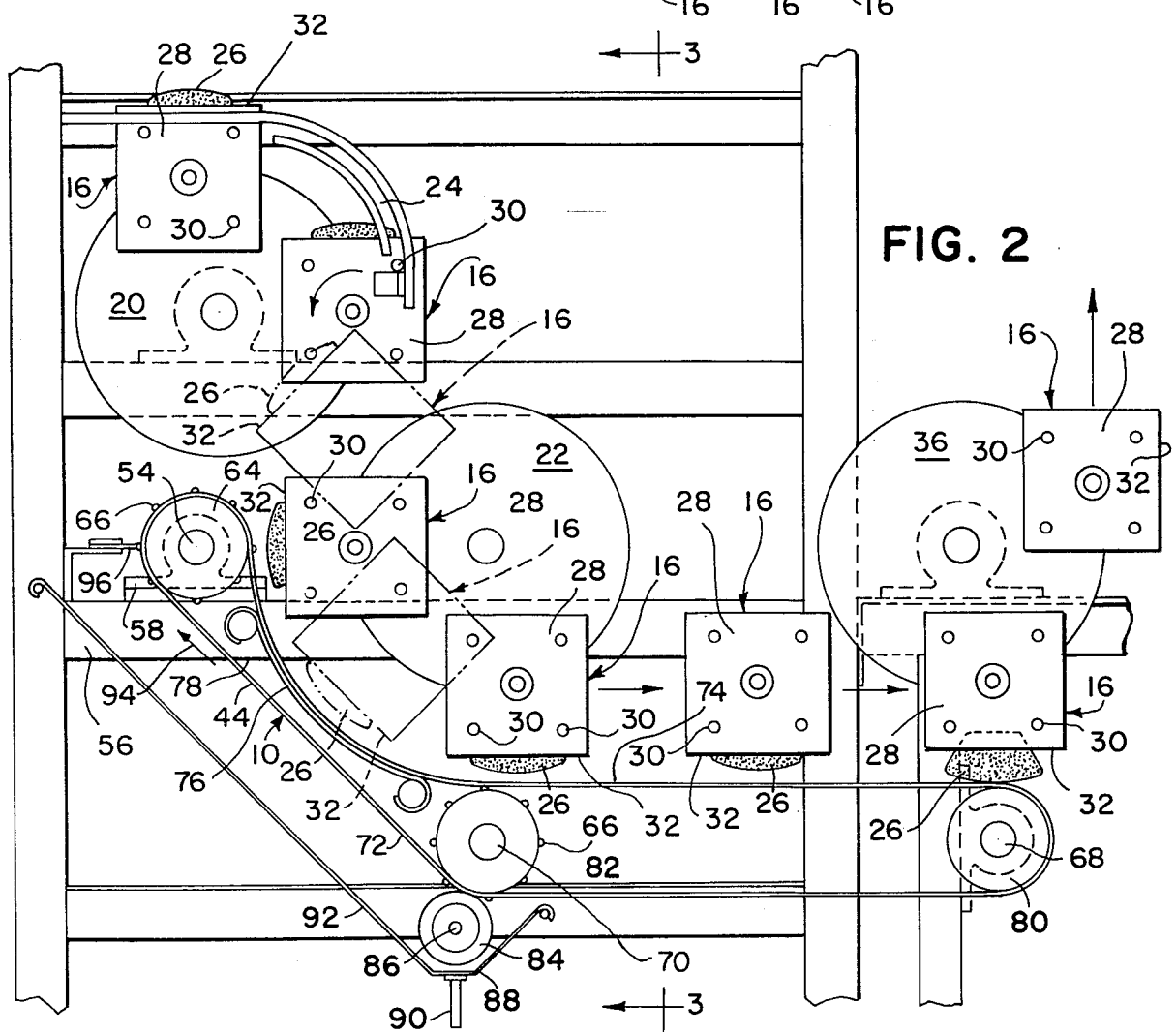
FIG. 2 is an enlarged, side elevational view of the curved path delivery conveyor of the present invention.
Figure 3:
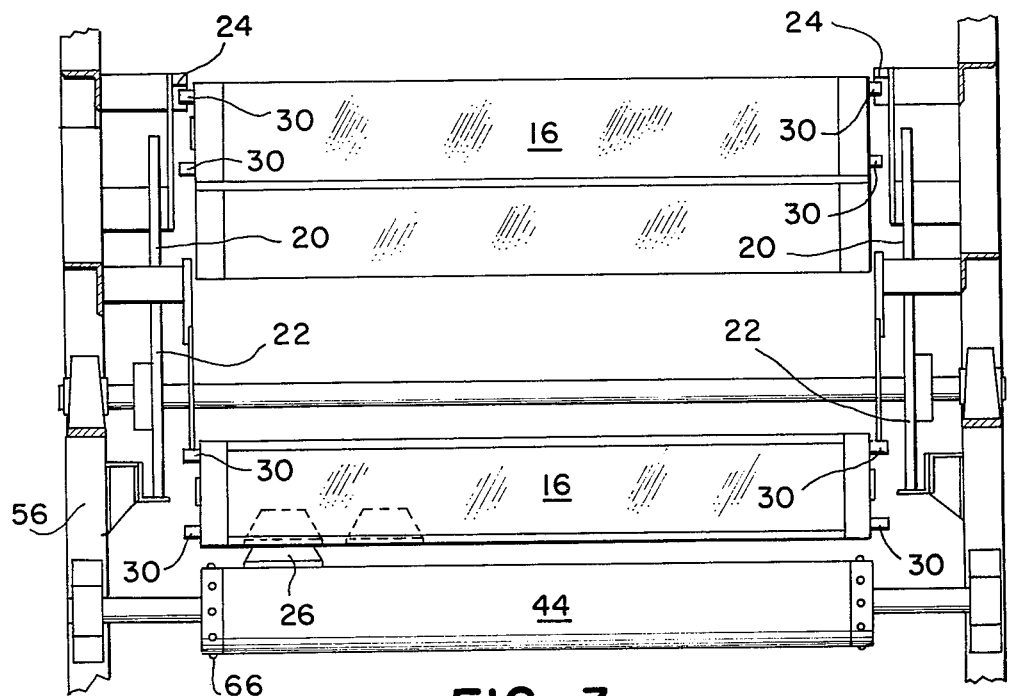
FIG. 3 is a cross sectional view taken along Line 3—3 of FIG. 2, looking in the direction of the arrows.
Figure 4:
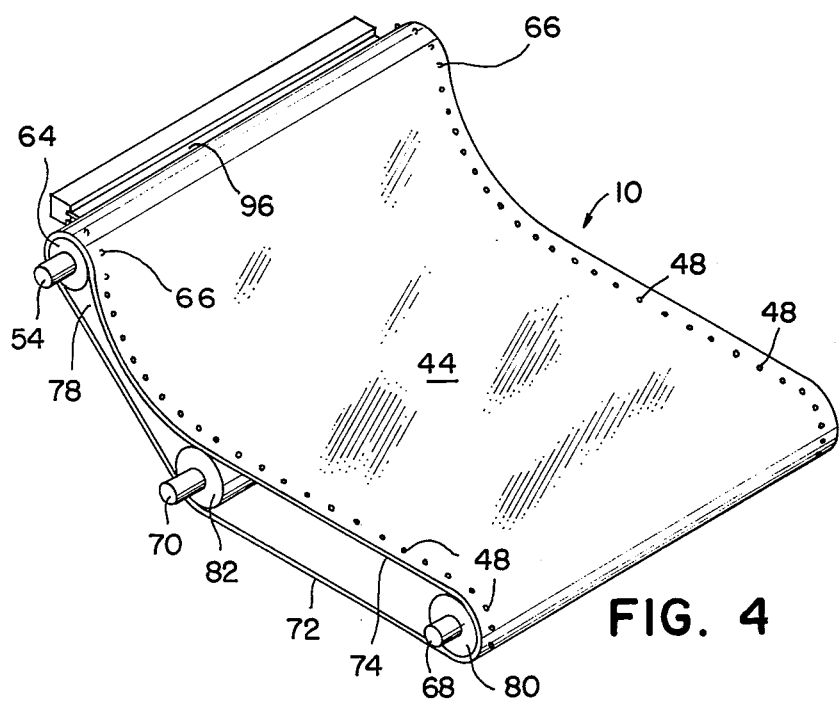
FIG. 4 is a perspective view of the curved path delivery conveyor of the present invention.

As best seen in FIG. 2, the discharge system comprising the upper and lower discharge rolls 20, 22 and the turn guide 24 cooperate to rotate each baking tray top 32 from a vertically upright position as it enters the discharge system in association with the upper discharge roll through 180° when each baking tray 16 leaves its association with the lower discharge roll 22 to thereby position the baking tray top 32 downwardly. It will be noted that each baking tray 16 is rotated through 90° by action of the upper discharge roll 20 and the guide 24 and then is rotated from the 90° position through to 180° by action of the lower discharge roll 22. The path followed by the baked products 26 about the lower discharge roll 22 is curved in nature and it will be noted that the baked goods 26 are carried by the discharge system from a completely vertically upright position at the top of the upper discharge roll 20 to a lower, vertically downwardly directed position at the bottom of the lower discharge roll 22. The baked products 26 follow a generally curved path about the lower discharge roll 22 and are continuously facing downwardly at angles varying from 90° to 180°. Due to the forces of gravity, it is possible for the baked product release to occur at any point in the travel path of a baking tray 16 as it is rotated about the lower discharge roll 22. Following the 180° rotation of each baking tray, the conveyor system 18 carries each baking tray 16 in a horizontal path 34 of sufficient length to insure complete product release from each baking tray. Following product release, the conveyor system 18 may be carried upwardly about a turn roller 36 which acts in conjunction with the turn rollers 38, 40, 42 to carry the empty baking trays 16 back to the oven entrance (not illustrated) for cleaning, refilling, and baking in a continuous manner.

The curved path delivery conveyor 10 positions beneath the upper and lower discharge rolls 20, 22, the horizontal path 34 of the conveyor system 18 and the turn roller 36 in a manner to receive all of the baked products 26 from the baking trays 18 as the baked goods are discharged at the discharge end 12. The curved path delivery conveyor includes an endless belt 44 which is preferably fabricated of Teflon coated fiber glass material of suitable strength to carry the released baked products 26 from the point of release to a delivery conveyor 46 which serves to carry the baked products to a wrapping or other processing station (not illustrated). The endless belt 44 extends transversely across the entire discharge end 12 and is fabricated of sufficient width to completely underlie the baking trays 16 as they are conveyed to the discharge end 12 of the baking oven 14.

The endless belt 44 is provided with a plurality of spaced grommets 48 along the right and left transverse edges 50, 52 for belt driving purposes. An upper shaft 54 journals upon the discharge end frame 56 in suitable, conventional bearings 58 and endwardly carries a drive pulley 60 in conventional manner. Preferably, the drive pulley 60 is provided with a belt drive 62 which interconnects the upper driving shaft 54 with the drive mechanism (not shown) of the conveyor system 18 in well known manner. Thus, the drive shaft 54 of the delivery conveyor 10 is simultaneously driven with the oven conveyor system 18 in suitable manner to assure operation of the curved path delivery conveyor 10 at all times when the baking oven conveyor system 18 is functioning. The upper shaft 54 carries a forward roller and a pair of transversely spaced drive sprockets 64 including teeth 66 which are rotatably insertable respectively into the grommets 48. Thus, when the drive sprockets 64 are rotated through action of the upper drive shaft 54, the sprocket teeth 66 drive the endless belt 44 at the grommets 48 thereof.

The endless belt turns about the upper shaft 54 and the rearward shaft 68 and encompasses the middle shaft 70. As best seen in FIG. 2, the rearward shaft 68 and the middle shaft 70 lie in the same horizontal plane and are positioned rearwardly of and below the upper shaft 54. It will be noted that the curved path delivery conveyor 10 is designed to tension the lower path 72 of the endless belt 44 for drive purposes thereby leaving the upper path 74 as the untensioned side of the belt system. By arranging the upper path 74 as the slack side of the delivery conveyor 10, the slack side can be readily utilized to serve as a curved transition path between the position of the upper shaft 54 and the lower and rearward position of the middle shaft 70. In this manner, the upper path 74 of the endless belt 44 can be conveniently shaped to conform to the path of travel followed by the baked products 26 as the baking trays 16 are rotated about the lower discharge roll 22 for product release purposes. Preferably, a curved guide 76 positions in the intermediate space 78 defined between the belt upper and lower paths 74, 72 to support and guide the upper belt path 74 in the desired, curved configuration. See FIG. 2. As hereinbefore set forth, the lower belt path 72 is tensioned by action of the upper shaft 54 through the drive sprockets 64 and is not otherwise supported or guided. The invention thus utilizes the natural sag in the endless belt 44 and the rigid nature of the curved guides 76 to form the desired curved configuration for product release purposes. The rearward shaft 68 and middle shaft 70 are each equipped with suitable rollers 80, 82 of conventional design which act as idlers in the curved path delivery conveyor system 10. Additionally, the rollers 80, 82 endwardly carry suitable teeth to engage the grommets 48.

As best seen in FIG. 2, a cleaning roller 84 tangentially contacts the middle roller 82 beneath the lower path 72 of the conveyor belt 44 for belt cleaning purposes. Preferably, the cleaning roller 84 is fabricated of relatively soft material to enhance the cleaning operation. The cleaning roller 84 turns about its driven shaft 86 which may be powered in a conventional manner from the machine drive (not illustrated). Preferably, the cleaning roller 84 is positioned within a cleaning trough 88 which is designed to hold a quantity of wash water (not shown) therein to facilitate an automatic belt cleaning operation. The trough 88 is provided with a bottom drain 90 to conventially convey the wash water (not shown) to a point of disposal. Preferably, the cleaning trough 88 is provided with an inclined, extended side 92 which is spaced from and positioned below the lower path 72 of the endless belt 44 to catch any water which may drip from the belt following the cleaning action of the cleaning roller 84 as the belt is rotated in the direction of the arrow 94 by function of the upper shaft 54. A doctor blade 96 affixes to a portion of the oven frame to position its cleaning edge against the underside of the endless belt 44 to scrape any waste baked material from the belt which may still adhere following the cleaning operation at the middle roller 82. The combination of the action of the cleaning roller 84 and the doctor blade 96 serves to continuously clean the belt conveyor 44 to permit continuous, automatic operation of the device.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a curved path delivery conveyor for function with a conveyor system the combination of A. an endless belt defining an upper path and a lower path,
  1. said belt rotating about an upper positioned roller and a lower positioned roller,
    a. the said lower positioned roller lying in a first horizontal plane that is spaced from and below a second horizontal plane drawn through the upper positioned roller;
B. means including a middle positioned roller to tension the lower belt path between the lower positioned roller and the upper positioned roller,
  1. at least a portion of the said upper path of the belt being untensioned to form a curved configuration portion,
  2. the said lower path being tensioned for belt rotation purposes,
  3. the said conveyor system conveying containers through an arcuate path, the said curved configuration of the upper path being spaced from and parallel with at least a portion of the arcuate path followed by the containers; and
C. the middle positioned roller being positioned intermediate the upper positioned roller and the lower positioned roller wherein the belt moves relative to the middle positioned roller,
  1. the middle positioned roller being located in the spaces defined by the said first or second horizontal planes.

2. The invention of claim 1 wherein the middle roller positions in the said first horizontal plane, the said upper path defining the curved configuration portion between the upper positioned roller and the middle roller.

3. The invention of claim 2 wherein the upper path of the belt defines a substantially straight, horizontal portion between the middle roller and the lower positioned roller.

4. The invention of claim 3 and a cleaning roller in tangential contact with the middle roller to form a nip therebetween.

5. The invention of claim 4 wherein the lower path of the belt is directed through the said nip.

6. The invention of claim 5 and a water containing trough positioned below the middle roller, the said cleaning roller being rotated within the trough.

7. The invention of claim 6 and a doctor blade in contact with a roller for belt cleaning purposes.

8. The invention of claim 7 wherein the roller is the upper positioned roller.

9. The invention of claim 8 wherein the upper belt follows the adjacent conveyor for a sufficient time to permit delayed releasing alignment prior to discharge to a processing conveyor operating at right angles to some.

10. The invention of claim 8 wherein the above belt system may be raised and lowered at the discharge end to permit inverted discharge to a takeaway conveyor.

11. A curved path delivery conveyor according to claim 1 and a curved guide means positioned in registry with at least a portion of the curved configuration portion of the upper path to guide the upper path.

12. The curved path delivery conveyor of claim 11 wherein the guide means contacts and shapes the curved portion of the upper path of the belt to conform to the curved configuration of the guide.

13. The curved path delivery conveyor of claim 12 wherein the means to tension includes a plurality of spaced grommets affixed to the belt and roller means which are rotatively driven, the roller means carrying pins which are insertable into the grommets for belt rotation purposes.

14. The curved path delivery conveyor of claim 13 wherein the roller means include either of the upper positioned roller or the lower positioned roller.

* * * * *